(12) United States Patent
Maguire et al.

(10) Patent No.: US 8,950,536 B2
(45) Date of Patent: Feb. 10, 2015

(54) MODULAR BATTERY ASSEMBLY SUPPORT AND SEALS

(75) Inventors: Patrick Daniel Maguire, Ann Arbor, MI (US); Mladen M. Marjanovic, Windsor (CA); Stephen W. Siu, Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 143 days.

(21) Appl. No.: 13/526,580

(22) Filed: Jun. 19, 2012

(65) Prior Publication Data

US 2013/0161105 A1    Jun. 27, 2013

Related U.S. Application Data

(60) Provisional application No. 61/578,804, filed on Dec. 21, 2011.

(51) Int. Cl.
*B60R 16/04*    (2006.01)

(52) U.S. Cl.
USPC ........................................................ 180/68.5

(58) Field of Classification Search
CPC ....................................................... B60R 16/04
USPC .............................. 180/68.5, 311, 65.1, 65.21
See application file for complete search history.

(56) References Cited

U.S. PATENT DOCUMENTS

| 5,378,555 | A  | * | 1/1995  | Waters et al. ................... 429/97 |
| 7,654,351 | B2 | * | 2/2010  | Koike et al. .................. 180/68.5 |
| 7,913,788 | B1 |   | 3/2011  | Bryer et al. |
| 8,006,793 | B2 |   | 8/2011  | Heichal et al. |
| 2008/0169139 | A1 | * | 7/2008 | Kramer ........................ 180/65.2 |
| 2010/0181129 | A1 |   | 7/2010 | Hamidi |
| 2010/0307848 | A1 | * | 12/2010 | Hashimoto et al. .......... 180/68.5 |
| 2011/0139527 | A1 | * | 6/2011  | Bannier et al. ............... 180/68.5 |

* cited by examiner

*Primary Examiner* — J. Allen Shriver, II
*Assistant Examiner* — Bryan Evans
(74) *Attorney, Agent, or Firm* — David B. Kelley; Brooks Kushman P.C.

(57) ABSTRACT

A battery assembly, or module, for a vehicle having a battery compartment that defines an opening in the floor. The battery module is disposed partially within the battery compartment and extends through an opening in the floor of a battery compartment to be partially disposed below the floor of the vehicle. A method of installing a battery module into a vehicle is also disclosed. The battery module is inserted partially into an opening in a floor of a battery compartment with a lower portion of the battery module being retained below the floor and an upper portion of the battery module being retained above the floor. A seal is attached between the battery module and the opening in the floor.

7 Claims, 3 Drawing Sheets

MODULAR BATTERY ASSEMBLY SUPPORT AND SEALS

CROSS-REFERENCE TO RELATED APPLICATIONS

This application claims the benefit of U.S. provisional Application No. 61/578,804 filed Dec. 21, 2011, the disclosure of which is incorporated in its entirety by reference herein.

TECHNICAL FIELD

This disclosure relates to packaging a high voltage battery pack in a vehicle to reduce the space required within the vehicle.

BACKGROUND

Electric vehicles that have an electric traction motor that is powered by a battery pack are being developed to reduce oil consumption. The size of the battery pack may be increased to maximize the available driving range for the vehicle. However, as the size of the battery pack increases, problems arise as to the space required to house the battery within the vehicle.

The battery cells in a battery pack must be protected from water, debris, extreme temperatures, noise and vibration. One location for a battery compartment may be the area immediately behind the rear seats of the vehicle. Placing the battery pack behind the rear seats reduces the space available for cargo storage. Storing the battery in another location may restrict the space available for other vehicle operating systems and passengers.

These and other problems are addressed by the following disclosure as summarized below.

SUMMARY

The battery pack includes an enclosed portion disposed inside the vehicle, and an exteriorly disposed portion that is outside of the body enclosure. The body structure must incorporate a large opening to accommodate the exteriorly disposed portion of the battery. The opening must be sealed to minimize the passage of air, moisture, sound, and thermal energy between the exterior and interior of the vehicle.

The battery pack is partially disposed inside of the vehicle with a bottom portion of the battery pack protruding below a floor of the battery compartment. Gravity holds the battery pack in position, and fasteners are used to secure the system with a Z axis clamp load. A closed cell foam material may be secured to the outside of the battery pack around the portion of the battery pack that protrudes through the vehicle body to seal the battery pack to the vehicle body structure. The seal is adhered to the battery enclosure by an adhesive but could be attached by glue, press-fit or the like. The battery is retained by fasteners that fasten the battery housing to the vehicle floor and compress and trap the seal.

According to one aspect of the disclosure, a vehicle is disclosed that has a battery that provides energy to drive the vehicle. The vehicle has a vehicle body defining a battery compartment having a wall below the battery compartment that defines an opening in the battery compartment. The battery is disposed partially within the battery compartment, and extends through the opening to be partially disposed outside the vehicle body.

According to other aspects of the disclosure, a reinforcement member may be assembled to the wall that frames the opening. A sealing member may be disposed between the battery and the reinforcement member that forms a seal between the opening in the wall and the battery. Another sealing member may be disposed between the floor and the reinforcement member to form a seal between the opening in the wall and the frame.

The battery is a T-shaped member that includes a first plurality of battery cells that are stacked horizontally in an upper battery cell compartment that extends transversely between a right end and a left end. A second plurality of battery cells that are stacked horizontally in a lower battery cell compartment that is disposed below the upper battery cell compartment. A right end of the upper battery cell extends outwardly from the lower battery cell compartment on the right side of the upper battery cell compartment. A left end of the upper battery cell extends outwardly from the lower battery cell compartment on the left side of the upper battery cell compartment.

A ladder-like support structure may be attached to the floor that has two rails that extend transversely in the vehicle. A pair of outer cross members may extend between the two rails below the right end and the left end of the upper battery compartment. A pair of inner cross members may extend between the two rails on opposite lateral sides of the opening in the battery compartment where the upper battery cell compartment is joined to the lower battery cell compartment. The battery may be installed as a module with the upper battery cell compartment being supported by the ladder support structure and the lower battery compartment being received in the opening in the floor. A central portion of the two rails between the inner cross members and the two inner cross members reinforce the floor around the opening. A seal may be attached to the lower battery cell compartment inboard of the opening in the floor.

According to another aspect of the disclosure, a method is disclosed for installing a battery module into a vehicle that has a battery compartment having a floor defining an opening that separates the battery compartment from the space below the vehicle. The method comprises inserting the battery module partially into the opening with a lower portion of the battery module being retained below the floor and an upper portion of the battery module being retained above the floor. A seal is attached between the battery module and the opening in the floor.

According to other aspects of the method, the step of attaching the seal may further comprise attaching the seal to the battery module between the upper portion and the lower portion of the battery module. The method may further comprise assembling a reinforcement member to the floor that defines a frame that extends about the opening in the floor. The step of attaching the seal may further comprise attaching the seal to the reinforcement member so that the battery module compresses the seal against the reinforcement member.

According to another aspect of the disclosure, a battery assembly is provided for a vehicle having a battery compartment that defines an opening in a floor of the battery compartment. A T-shaped battery housing is provided that has a lower portion that is below an upper portion that has two outer ends that extend in two opposite transverse directions laterally outboard and above the lower portion. The assembly also includes a reinforcement member attached to the floor of the battery compartment and that has a central portion that is partially disposed about the opening that supports the battery container adjacent the opening. The reinforcement member has extensions that extend in the transverse direction and support the two outer ends of the upper portion of the battery container, wherein the lower portion of the battery container is suspended from the upper portion of the battery container to extend through the opening.

The above aspects of the disclosure and other aspects will be better understood in view of the attached drawings and the following detailed description of the illustrated embodiments of the disclosure.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
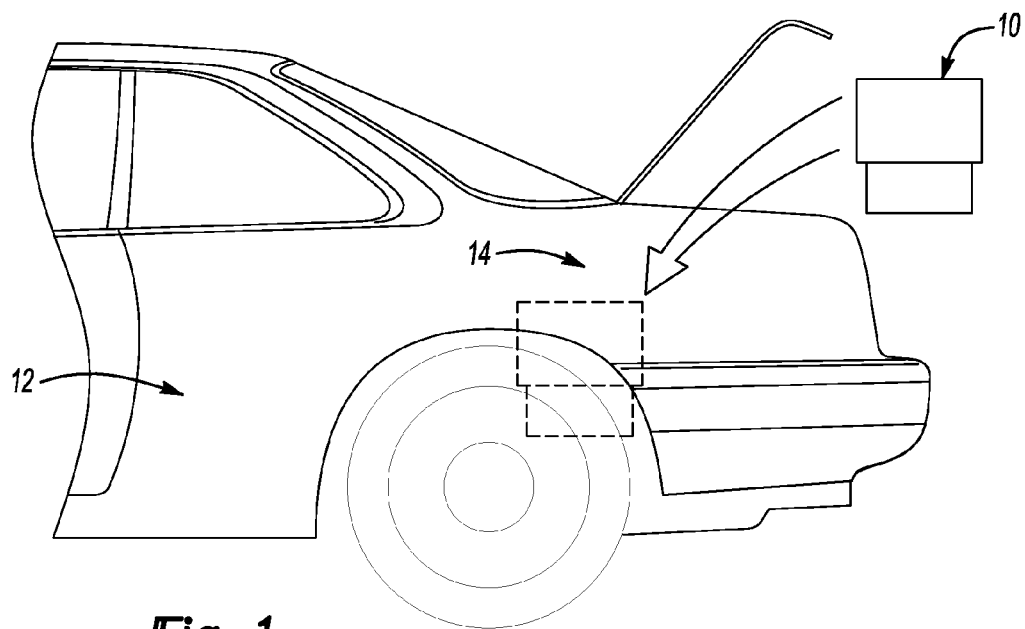
FIG. 1 is a diagrammatic side elevation view of a vehicle with a battery module in position to be installed in the vehicle.

Referring to FIG. 1, a battery assembly 10, or module, is shown in position to be installed in a vehicle 12. A battery compartment 14 is provided in the vehicle 12, as will be more specifically described with reference to FIGS. 2 and 3 below.

Figure 2:
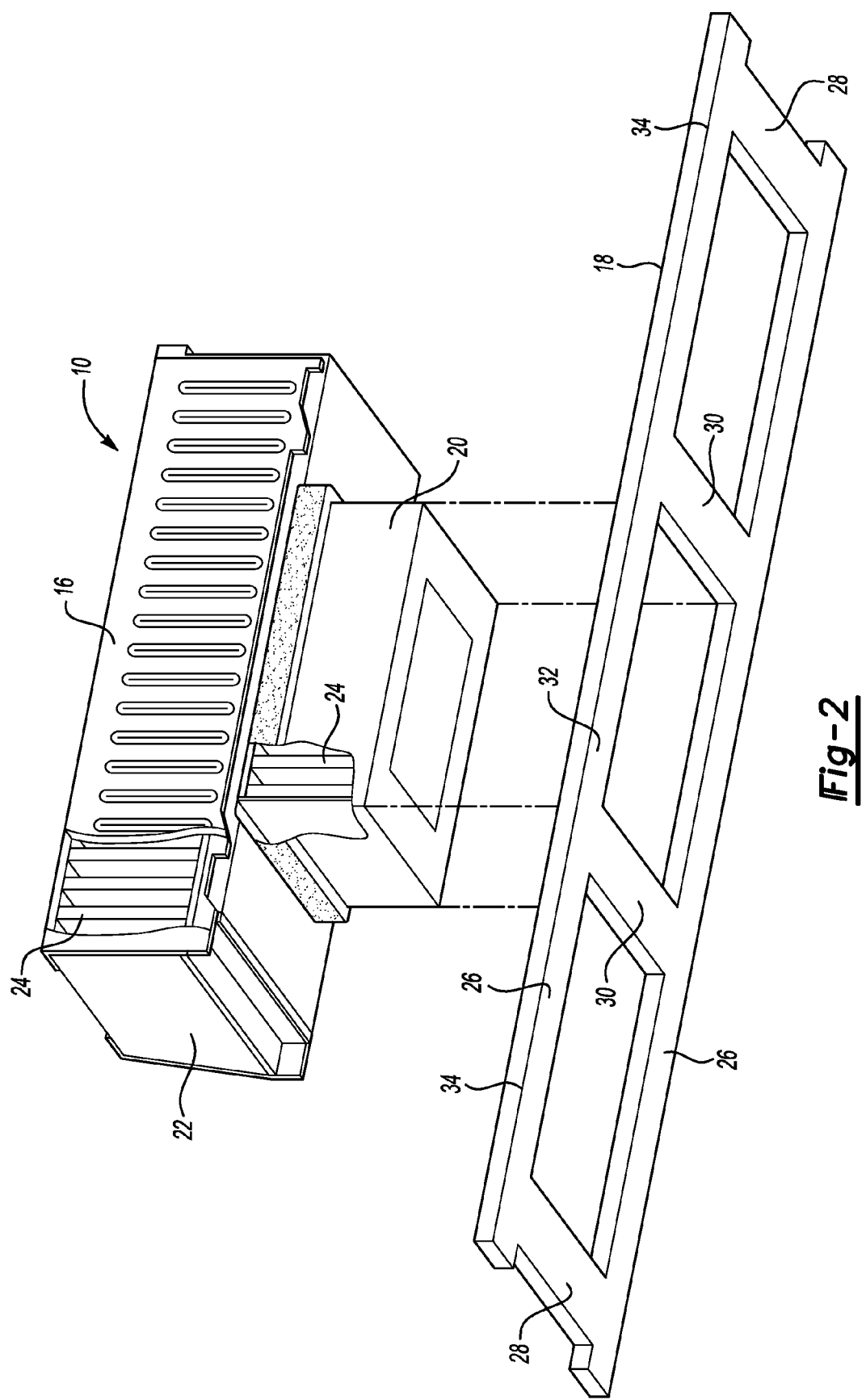
FIG. 2 is a perspective view of a battery module disposed above a reinforcement that is secured to the floor of a battery compartment in the vehicle.

Referring to FIG. 2, the battery module 10 is shown to include a T-shaped battery container 16, or housing, that is disposed above a reinforcement member 18, or ladder support structure. The T-shaped battery container 16 includes a lower portion 20 and an upper portion 22. A plurality of battery cells 24 are arranged in the lower portion 20 and upper portion 22 of the container 16. The reinforcement member 18 includes a pair of rails 26 that extend transversely across the vehicle. A pair of outer cross members 28 and a pair of inner cross members 30 extend between the rails 26. A central portion 32 of the reinforcement member 18 is adapted to receive the lower portion 20 of the housing 16. A pair of extensions 34 are provided that extend outwardly from the central portion 32 and may facilitate supporting the upper portion 22 of the T-shaped battery container 16.

Figure 3:
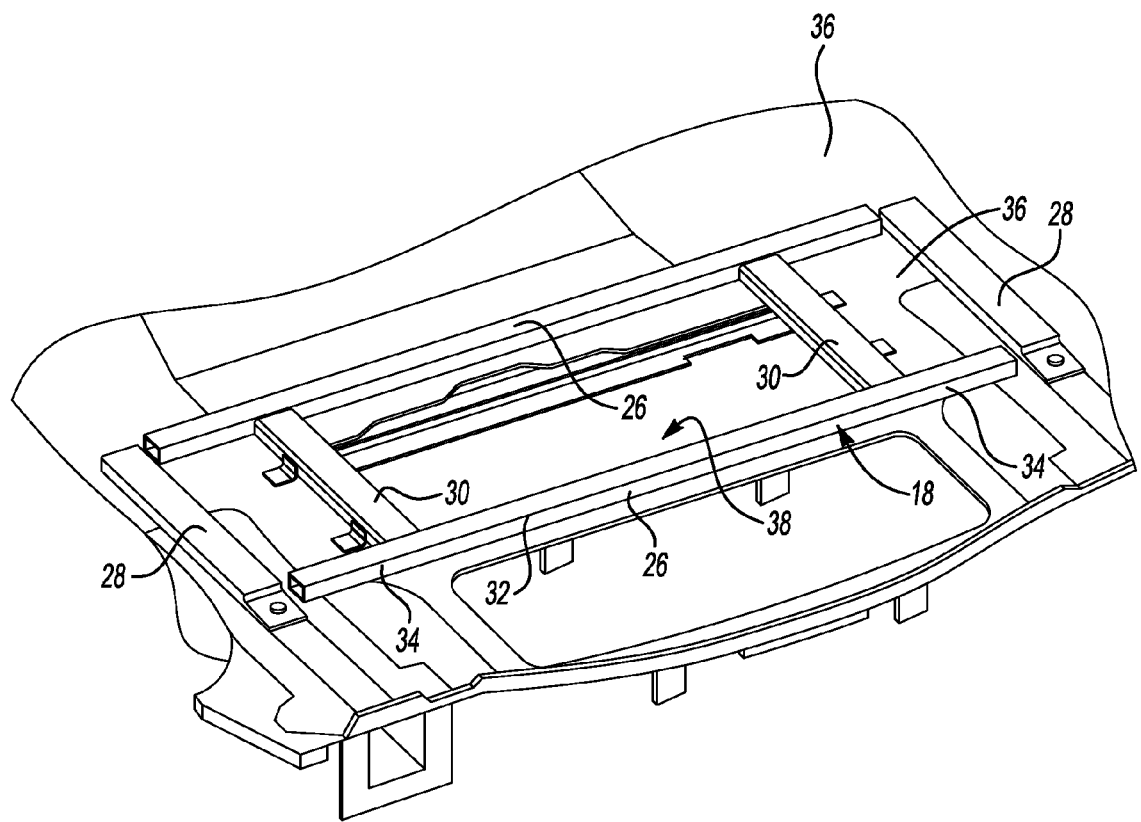
FIG. 3 is a perspective view of the reinforcement installed in the floor of a battery compartment of a vehicle.

Referring to FIG. 3, the reinforcement member 18 is shown secured to the floor 36, or wall, that defines an opening 38. The battery assembly 10 is partially disposed below the floor 36 and extends through the opening 38. The reinforcement member 18 forms a frame-like structure around the opening 38 in the floor 36. The reinforcement member 18, as installed, includes the rails 26, outer cross members 28 and inner cross members 30. The rails 26 and inner cross members 30 form the central portion 32 that is disposed about the opening 38 in the floor 36. Extensions 34 are provided to support the upper portion 22 of the battery container 16.

Figure 4:
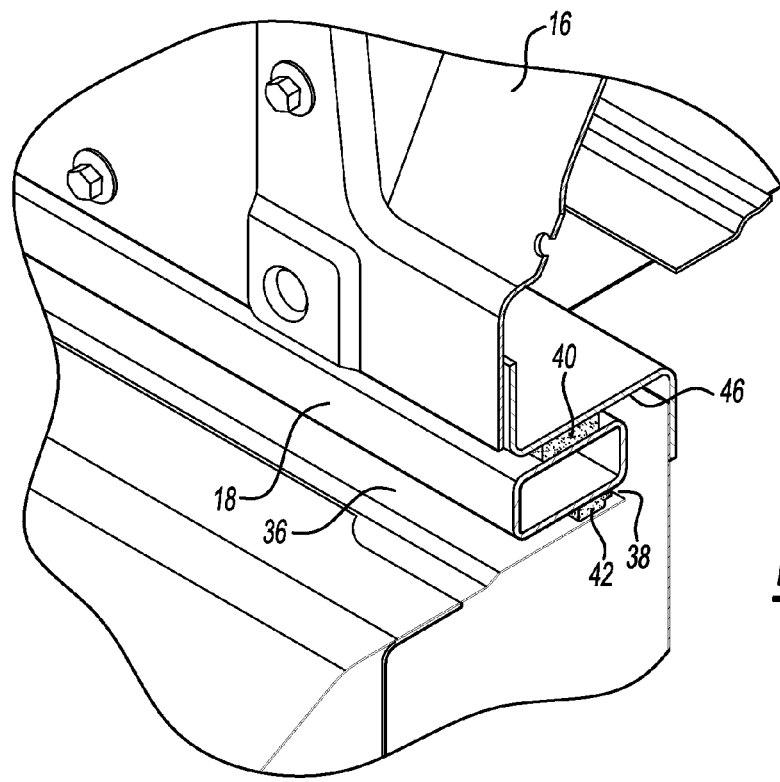
FIG. 4 is a fragmentary perspective cross-sectional view of the front portion of a battery housing secured to the reinforcement and disposed within the opening in the floor.

Referring to FIG. 4, the front side of the battery container 16 is shown assembled to the reinforcement member 18. The reinforcement is shown installed on the floor 36. The reinforcement is secured about the opening 38 in the floor 36. A seal 40 is provided between the battery housing 16 and the reinforcement 18. Another seal 42 is provided between the reinforcement 18 and the floor 36. The seals 40 and 42 form a seal between the exterior of the vehicle and the vehicle interior. The seals 40 and 42 prevent ingress or egress of fluids and debris from outside of the vehicle to the vehicle interior.

Figure 5:
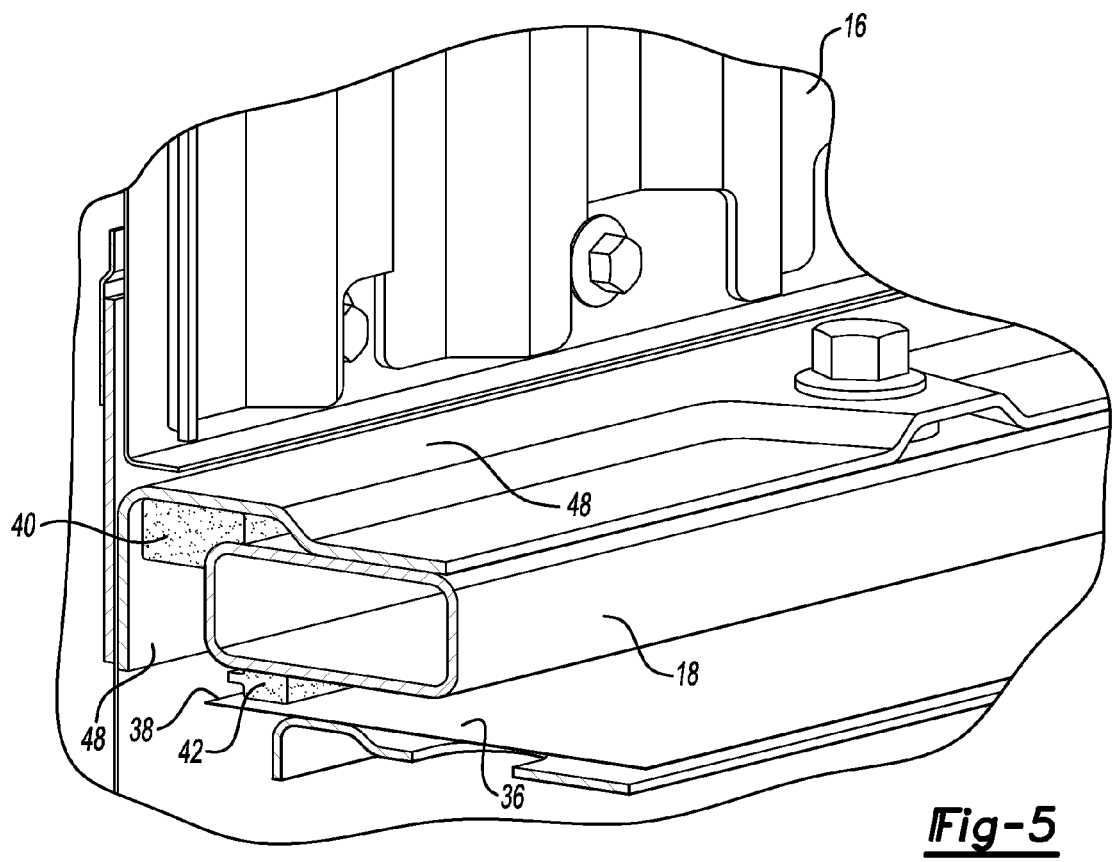
FIG. 5 is a fragmentary cross-sectional perspective view of the rear portion of the battery housing secured by a flange to the reinforcement and disposed within the opening in the vehicle floor.

Referring to FIG. 5, the rear side of the battery enclosure 16 is shown to include a mounting bracket 48. The mounting bracket 48 is secured to the battery housing 16 and is cantilevered over the reinforcement 18. The reinforcement 18 is attached to the floor of the vehicle and forms a frame around the opening 38 in the floor 36. A seal 40 is reassembled to the battery housing 16 and is partially compressed against the reinforcement 18. Another seal 42 is provided between the reinforcement and the floor of the vehicle. The seal 42 extends around the opening 38 to which the battery housing 16 extends. The seals 40 and 42 prevent fluids or gases from entering the vehicle through the opening 38 in the vehicle floor 36. The seals 40 and 42 also extend along the sides of the battery housing 16.

Mounting bracket 48 may include an upper portion and a lower portion. The lower portion contacts the reinforcement 18 to support the mass of the battery container 16 on the vehicle 12. The seal 40 is compressed into a gap defined by the upper portion of the mounting bracket 48.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a plurality of battery cells that power the vehicle;
   a battery housing enclosing the battery cells wherein the battery housing is a T-shaped member that includes:
   a first plurality of battery cells that are stacked horizontally in an upper battery cell compartment that extends transversely between a right end and a left end;
   a second plurality of battery cells that are stacked horizontally in a lower battery cell compartment that is disposed below the upper battery cell compartment with a right end of the upper battery cell compartment extending outwardly from the lower battery cell compartment on a right side of the upper battery cell compartment and a left end of the upper battery cell compartment extending outwardly from the lower battery cell compartment on a left side of the upper battery cell compartment;
   a vehicle body defining a battery compartment having a floor that defines an opening;
   a ladder support structure attached to the floor having two rails that extend transversely in the vehicle, a pair of outer cross members extending between the two rails below the right end and the left end of the upper battery cell compartment, a pair of inner cross members extending between the two rails on opposite lateral sides of the opening in the floor where the upper battery cell compartment is joined to the lower battery cell compartment; and wherein the battery housing and a first plurality of the battery cells are disposed partially above the floor and wherein the battery housing extends through the opening to be partially disposed below the floor with a second plurality of the battery cells disposed below the floor.

2. The vehicle of claim 1 further comprising a reinforcement member assembled to the floor that frames the opening.

3. The vehicle of claim 2 further comprising a seal disposed between the battery housing and the reinforcement member that seals between the opening in the floor and the battery housing.

4. The vehicle of claim 2 further comprising a seal disposed between the floor and the reinforcement member that seals between the opening in the floor, and the reinforcement member.

5. The vehicle of claim 1 wherein the battery is installed as a module with the upper battery cell compartment being supported by the ladder support structure and the lower battery cell compartment being received through the opening in the floor.

6. The vehicle of claim 1 wherein a central portion of the two rails between the pair of inner cross members reinforces the floor around the opening in the floor.

7. The vehicle of claim 1 further comprising a seal attached to the lower battery cell compartment inboard of the opening in the floor.

* * * * *